(12) United States Patent
Go

(10) Patent No.: US 10,280,327 B1
(45) Date of Patent: May 7, 2019

(54) COMPOSITIONS FOR ECO-FRIENDLY CRAYON AND METHODS FOR PREPARING THE SAME

(71) Applicant: NOV. & MARCH, Seoul (KR)

(72) Inventor: Jaejin Go, Seoul (KR)

(73) Assignee: NOV. & MARCH, Seoul (KR)

( * ) Notice: Subject to any disclaimer, the term of this patent is extended or adjusted under 35 U.S.C. 154(b) by 0 days.

(21) Appl. No.: 15/831,347

(22) Filed: Dec. 4, 2017

(51) Int. Cl.
 *C09D 13/00* (2006.01)
(52) U.S. Cl.
 CPC .................................... *C09D 13/00* (2013.01)
(58) Field of Classification Search
 CPC ....................................................... C09D 13/00
 See application file for complete search history.

(56) References Cited

U.S. PATENT DOCUMENTS

| | | | | |
|---|---|---|---|---|
| 2,560,195 A * | 7/1951 | Smith | ................ | C09D 13/00 106/31.08 |
| 5,397,387 A * | 3/1995 | Deng | ................ | C09D 11/36 106/31.37 |
| 5,449,399 A * | 9/1995 | Tsuei | ................ | C09D 13/00 106/31.07 |
| 6,022,402 A * | 2/2000 | Stephenson | ............ | C08L 91/06 106/272 |
| 6,752,862 B2 * | 6/2004 | Hiramoto | ............... | A01N 43/16 106/31.58 |
| 2015/0104234 A1 * | 4/2015 | Falken | ................ | C09D 13/00 401/96 |
| 2018/0112095 A1 * | 4/2018 | Falken | ................ | C08K 5/09 |

* cited by examiner

*Primary Examiner* — Veronica F Faison
(74) *Attorney, Agent, or Firm* — Lucas & Mercanti, LLP

(57) ABSTRACT

The present invention is related to a method for preparing an eco-friendly crayon comprising: a) adding a pigment and food coloring agent while melting beeswax by heating; b) cooling the beeswax to block and then pulverizing the blocked beeswax; c) melting carnauba wax by heating; d) mixing the pulverized beeswax obtained in the step b with the carnauba wax obtained in the step c to prepare a mixture; and e) placing the mixture into a mold and cooling the mixture to prepare crayons, and an eco-friendly crayon including beeswax, the pigment, the food coloring agent, and carnauba wax prepared by the method.

9 Claims, 2 Drawing Sheets

COMPOSITIONS FOR ECO-FRIENDLY CRAYON AND METHODS FOR PREPARING THE SAME

FIELD OF THE INVENTION

The present invention is related to a composition for eco-friendly crayon and a method for preparing the same.

BACKGROUND OF THE INVENTION

Crayons are a coloring tool used to draw pictures, and are used to draw or paint a desired picture by rubbing it on paper such as a drawing paper. Such crayons are usually made of clay, chalk, graphite, a pigment, beeswax, etc., and have a small prism shape or a cylindrical shape. It is divided into colored crayons and chalk crayons depending on the usage. Wax crayons among colored crayons is used by students to draw pictures.

Conventionally, crayons were prepared using paraffin as the main raw material. Such paraffin raw materials sometimes contain harmful components or toxic substances. Therefore, when young children use crayons, the crayons come into contact with the skin and thus harmful components or toxic substances can be absorbed into the skin. This has been a problem because it causes skin irritation or have a negative impact on one's health.

SUMMARY OF THE INVENTION

The present invention provides an eco-friendly, non-toxic crayon free of harmful components and preventing crayons from remaining in user's hand by using beeswax, rice wax and vegetable raw materials which are eco-friendly materials.

The eco-friendly material in the present invention is not limited to beeswax or rice wax and can be replaced with a natural material or an eco-friendly material.

According to one embodiment of the present invention to solve the above problem, there is provided an eco-friendly crayon including beeswax, a pigment, a food coloring agent, and carnauba wax.

According to another embodiment of the present invention, there is provided a method for preparing an eco-friendly crayon comprising: a) adding a pigment and food coloring agent while melting beeswax by heating; b) cooling the beeswax to block and then pulverizing the blocked beeswax; c) melting carnauba wax by heating; d) mixing the pulverized beeswax obtained in the step b with the carnauba wax obtained in the step c to prepare a mixture; and e) placing the mixture into a mold and cooling the mixture to prepare crayons.

DETAILED DESCRIPTION OF THE INVENTION

Figure 1:
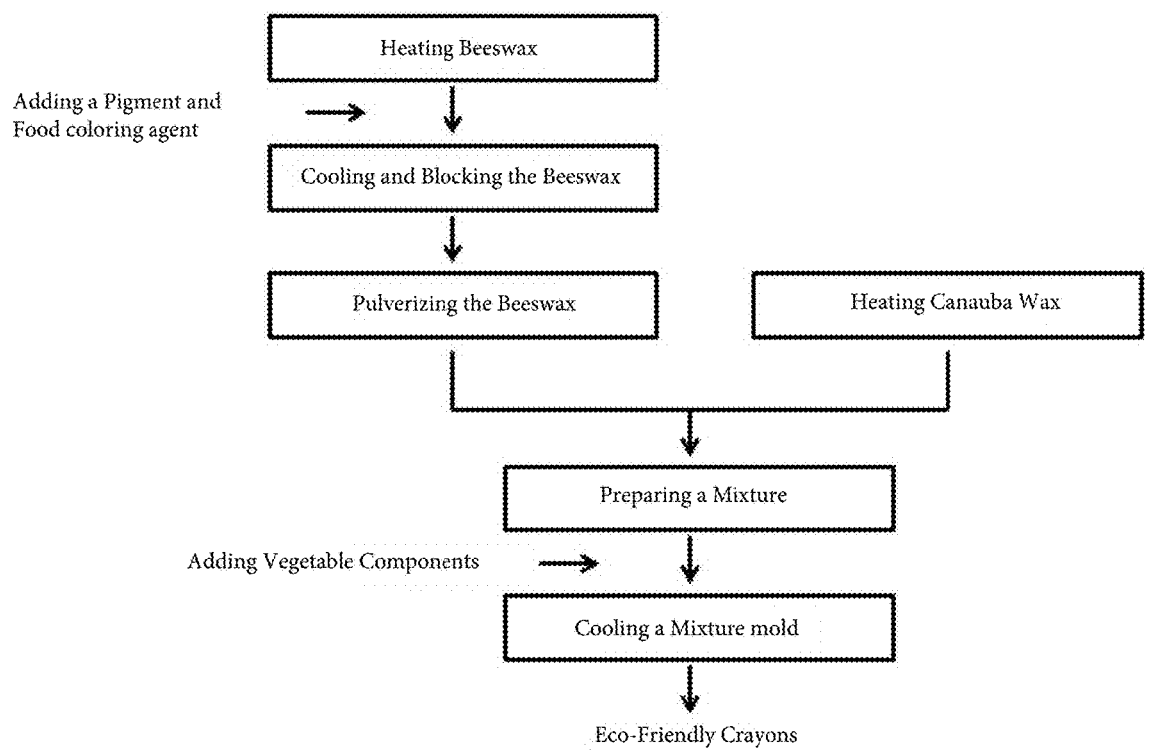
FIG. 1 is a schematic view illustrating a process for preparing an eco-friendly crayon according to the present invention.

According to one embodiment of the present invention to solve the above problem, there is provided an eco-friendly crayon including beeswax, a pigment, a food coloring agent, and carnauba wax.

The eco-friendly material in the present invention is not limited to beeswax or rice wax and can be replaced with a natural material or an eco-friendly material.

According to another embodiment of the present invention, there is provided a method for preparing an eco-friendly crayon comprising: a) adding a pigment and food coloring agent while melting beeswax by heating; b) cooling the beeswax to block and then pulverizing the blocked beeswax; c) melting carnauba wax by heating; d) mixing the pulverized beeswax obtained in the step b with the carnauba wax obtained in the step c to prepare a mixture; and e) placing the mixture into a mold and cooling the mixture to prepare crayons.

Hereinafter, preferred embodiments of the present invention will be described with reference to the accompanying drawings. Although the present invention has been described with reference to embodiments shown in the drawings, it is described as an embodiment, and the technical teaching, core structure, and action of the present invention are not limited thereby.

Eco-Friendly Crayon

An eco-friendly crayon according to one embodiment of the present invention includes beeswax, a pigment, a food coloring agent, and carnauba wax.

The eco-friendly crayon according to one embodiment of the present invention includes 10-50%, 15-45%, 20-40%, or 25-35% by weight beeswax, 0.5-20%, 1-15%, 2-10%, or 2-7% by weight a pigment, a food coloring agent, or a pigment and food coloring agent, and 30-80%, 45-70%, or 50-65% by weight carnauba wax.

Optionally, 1-10% 1.5-8%, or 2-7% wt/wt vegetable fat is included in the composition.

The amount of the wax and the oil is adjusted by the amount and property of the pigment or food coloring agent used.

Beeswax is a material used by honeybees to build honeycombs that keep honey and raise eggs and larvae. The beeswax is produced in the honey bees' body through the biochemical process by the enzymatic action of sugar collected from flowers by the honey bees.

The main component of the beeswax is cerotic acid and a palmitic acid ester of melissyl alcohol, and further contains various fatty acid, alcohol, and higher hydrocarbon, etc. The beeswax is an amorphous material generally having a melting point of 62 to 63° C., a specific gravity of 0.961 to 0.973, a refractive index of 1.456 to 1.459, a saponification value of 86 to 93, an iodine value of 8 to 14, and a slight sticky property.

By using carnauba wax having a high melting point, the sticky property of the beeswax is optimized not to leave colors or the crayons on the users' hands. Beeswax softens by the users' body temperature and leaves residue on the users' hands.

Unlike crayons prepared by conventional techniques, the present invention does not include harmful components or toxic substances in the human body by preparing crayons using beeswax which is a natural and eco-friendly material as described above as the main material. Therefore, the present invention provides an advantage that it does not cause skin irritation or health problems even when used by young students and infants.

The pigment used in the present invention is used for coloring crayons. For example, a non-carbon based pigment, a plant extract natural pigment, non-toxic tint, a saturation pigment, an inorganic pigment, an organic pigment, etc. is used as the pigment. In one embodiment of the present invention, the pigment is contained in the eco-friendly crayons in an amount of 2 to 8 parts by weight based on 100 parts by weight of the beeswax. When the pigment is contained in an amount of less than 2 parts by weight, the tinting strength and the hiding ability is low, resulting in a problem that utility as an art tool is reduced. On the other hand, when the pigment is contained in an amount exceeding 8 parts by weight, it is difficult to produce crayons because the pigment is difficult to agitate due to the saturated pigment.

The food coloring agent in the present invention is used for further enhancing color forming ability of the pigment during crayon production. For example, paprika extract color, berry color, and *gardenia* blue color is used as the food coloring agent, but the kind thereof is not particularly limited. In one embodiment of the present invention, the pigment is contained in the eco-friendly crayons in an amount of 1 to 2 parts by weight based on 100 parts by weight of the beeswax. When the food coloring agent is contained within the above part by weight range, color forming ability of the pigment is effectively increased.

The carnauba wax, also called Brazil wax, is a natural wax material obtained from carnauba (*Corpenicia prunifera*) palm trees that live only in the northeastern region of Brazil. The carnauba wax is obtained as hard, thin pieces of yellowish color (or brown) and is processed into a wax component through processes such as selection, purification, bleaching and the like. The carnauba wax has high light resistance and thus protects the eco-friendly crayons according to the present invention from the visible light and ultraviolet ray. Further, the carnauba wax enhances the heat resistance of the eco-friendly crayons and thus when using the eco-friendly crayons, it prevents the eco-friendly crayons from melting or leave residue on a user's hand due to the body temperature. Also, the carnauba wax is given a proper strength to the crayons so that it does not break easily when used.

In one embodiment of the present invention, the carnauba wax is contained in an amount of 3 to 15 parts by weight based on 100 parts by weight of the beeswax. When the carnauba wax is contained in an amount of less than 3 parts by weight based on 100 parts by weight of the beeswax, the strength of the crayons is insufficient and an amount of the beeswax is relatively high. Therefore, the ability to color is deteriorated due to flexibility, viscosity, and aggregation, which are characteristics of the beeswax. On the other hand, when the carnauba wax is contained in an amount exceeding 15 parts by weight, the hardness of the crayons becomes excessively high, and thus the color implementation ability becomes poor and breaks easily.

The eco-friendly crayons according to the present invention further include one or more vegetable components selected from a group consisting of vegetable fat and vegetable wax.

The vegetable fat is a wax generally made by pounding fruit of a lacquer tree or a wax tree, and is used to make candles, matches, cosmetics, ointments and the like or to lubricate instruments. In addition, the vegetable fat is extracted from plant seeds and contains hydrogenated triglyceride, and thus have a soft semi-solid form at room temperature and rapidly turn into a liquid at temperatures above body temperature. The vegetable fat is also used in cosmetics to protect the skin epithelium.

The vegetable wax is obtained from a shell of a plant containing an aliphatic compound, hydroxycarboxylic acid, aliphatic alcohol of odd or even carbon skeleton, and sometimes be in the form of a hydrogen-bonded viscous liquid. An example of the vegetable wax includes soy wax and the like.

The vegetable fat and vegetable wax enable the eco-friendly crayons to move smoothly and color well on paper when the finally prepared eco-friendly crayons are used on paper such as drawing paper.

In one embodiment of the present invention, one or more vegetable components selected from a group consisting of the vegetable fat and vegetable wax is contained in an amount of 2 to 3 parts by weight based on 100 parts by weight of the beeswax. When the wax is contained in an amount of less than 2 parts by weight based on 100 parts by weight of the beeswax, color decreases. Further, when the wax is contained in an amount exceeding 3 parts by weight, crushing occurs, and the melting point gets lowered, so that the crayons are easily melted or leave residue on the user's hand at in body temperature.

Method for Preparing an Eco-Friendly Crayon

A method for preparing an eco-friendly crayon according to one embodiment of the present invention includes a) adding a pigment and food coloring agent while melting beeswax by heating; b) cooling the beeswax to block and then pulverizing the blocked beeswax; c) melting carnauba wax by heating; d) mixing the pulverized beeswax obtained in the step) with the carnauba wax obtained in the step c to prepare a mixture; and e) placing the mixture into a mold and cooling the mixture to prepare crayons.

In another embodiment of the present invention, after the step d and before the step e, the method further comprises cooling the mixture to a temperature range of 50 to 60° C. and adding one or more vegetable components selected from a group consisting of vegetable fat and vegetable wax.

First, the beeswax is melted by heating while adding the pigment and food coloring agent (step a).

According to one embodiment of the present invention, the above-described solid-form beeswax is arranged, and the beeswax is heated in a container at a temperature of about 60 to 90° C. The solid-form beeswax is melted through the heating. At this time, the pigment is added in an amount of 2 to 8 parts by weight based on 100 parts by weight of the beeswax, and the food coloring agent is added in an amount of 1 to 2 parts by weight based on 100 parts by weight of the beeswax.

A dual chamber agitator is used to heat the beeswax and carnauba wax. In this case, superior agitating force and high thermal conductivity are achieved compared to a general single chamber agitator, and thus excellent quality and uniform color forming is realized.

In the step, the heating process is carried out at 60-90° C. or 60-70° C. When the heating temperature is lower than 60° C., the beeswax does not sufficiently melt, and when the temperature exceeds 90° C., the beeswax, the pigment, and the food coloring agent are burned, and thus the inherent properties of the coloring are lost. Therefore, in the latter two cases, it is difficult to produce the final product, crayons, and it is difficult to realize a desired color.

Next, the beeswax having been subjected to the step a is cooled to block, and the blocked beeswax is pulverized (step b).

The size of blocks to be blocked in the blocking process is not particularly limited, and the size can be changed according to the needs. For example, the size of blocks is adjusted according to the size of a target product. In addition, the remaining portion after blocking can be stored separately for later use.

Pulverizing is to facilitate mixing with the carnauba wax, which will be described later in the step d. The pulverization size is not particularly limited, and the process is not particularly limited. However, due to possibilities of the contamination or unnecessary loss of raw material, it is appropriate to carry out the step under the control in a separately provided space during the smashing process to pulverize.

Next, the carnauba wax arranged in advance is melted in a separate container by heating (step c).

According to one embodiment of the present invention, the above-described solid-form carnauba wax is arranged, and the carnauba wax is heated in a container at a temperature of about 70 to 95° C. Through the heating, the solid-form carnauba wax is melted. At this time, the carnauba wax is arranged to be 3 to 15 parts by weight based on 100 parts by weight of the beeswax.

In the step, the heating process is carried out at 70-95° C. or 80-90° C. When the heating temperature is lower than 70° C., the carnauba wax does not sufficiently melt. When the temperature exceeds 95° C., since carnauba wax is burned, a raw material has to be fed excessively thereby lowering economic feasibility, and it is difficult to carry out the natural coating effect and act as a color former, which are characteristics inherent to the carnauba wax.

Next, a mixture is prepared by mixing the pulverized beeswax obtained in the step b and the carnauba wax obtained in the step c (step d).

Specifically, the carnauba wax obtained in the step c is cooled at room temperature or through a cooling process, wherein when the carnauba wax reaches a temperature of about 75 to 85° C., the pulverized beeswax obtained in the step b is added and mixed. Through this mixing process, the pulverized beeswax are mixed with the carnauba wax and melted to form a viscous mixture such as a semi-solid/semi-liquid form.

In this stage, since the temperature difference between the carnauba wax and the beeswax is large, it is preferable not to liquidize the wax in the blocked/unblocked state.

When liquifying without a blocking process, it is preferable that the carnauba is melted first, then the beeswax is added, and when the coloring is finally added, the temperature of the wax should not exceed 65-70 degrees Celsius.

Finally, the resulting mixture is cooled in a mold and the eco-friendly crayons are prepared (step e).

The cooling step is not particularly limited, and the eco-friendly crayon is prepared by cooling the mixture in a temperature range of −10 to −20° C. in a mold. Since the fast cooling is performed under the above temperature range condition, the crayons according to the present invention is rapidly prepared, and the final product is manufactured in a desired shape.

The mold used in the cooling process is not particularly limited as long as it is generally used in the technical field related to the present invention.

In one embodiment of the present invention, after the step d and before the step e, the method further comprises cooling the mixture to a temperature range of 50 to 60° C. or 50 to 70° C. and adding one or more vegetable components selected from a group consisting of vegetable fat and vegetable wax.

In cooling the mixture of the step d, when the temperature falls below 50° C., the viscosity of the wax increases and it solidifies immediately upon contact with the mold, resulting in the formation of layers (wrinkles), which hinders the merchantability.

When the mixture of the step d is 70° C. or more, it is too hot so that a lot of bubbles occur, and wax shrinkage is severe and thus cracks occur.

As described above, the one or more vegetable components selected from the group consisting of the vegetable fat and the vegetable wax are used to give properties that the final product, eco-friendly crayons, move smoothly and color well on paper, and do not easily leave colors or the crayons on the user's hand. In one embodiment of the present invention, the one or more vegetable components is added in an amount of 2 to 3 parts by weight based on 100 parts by weight of the beeswax.

As described above, the eco-friendly crayons according to the present invention use natural/eco-friendly materials as a raw material, unlike crayons prepared according to conventional techniques. Therefore, the finally prepared environmentally friendly crayons are harmless to the human body and do not cause skin irritation or harm to the human body even when used by children, young students, and infants. In addition, since the eco-friendly crayons are not easily remaining colors or the crayons on the user's hand and smoothly slip when using on paper, the user can color the paper without putting a strain on the user's wrist.

EXAMPLES

Hereinafter, the configuration and operation of the present invention will be described in more detail with reference to preferred embodiments of the present invention. However, it is presented as a preferred example of the present invention and cannot be construed as limiting the present invention in any way. The contents not described here is sufficiently technically derived by those skilled in the art, so the description thereof will be omitted.

Example

Example 1

1 kg of beeswax was arranged and placed in a container for heating, and the wax was heated and melted at a temperature of 80° C. for 1 hour. In the step, 50 g of Mars black, green oxide, and/or ferric oxide were added as a pigment, 20 g of squid ink extract powder and/or *gardenia* powder were mixed together as a food coloring agent. Through a heating process, the beeswax mixed with the pigment and the food coloring agent was poured into a molding mold for blocking, hardened at −15° C. condition for 20 minutes, and blocked. The blocked beeswax was smashed and processed into a powder form.

Next, 150 g of carnauba wax was arranged and placed in a container for heating, and the wax was heated and melted at a temperature of 80° C. for 20 minutes. After the beeswax processed into the powder form was added to the viscous carnauba wax, the two kinds of waxes were agitated to be completely mixed for 30 or more minutes while maintaining a temperature at 80° C.

The mixture completely agitated were cooled, wherein when a temperature of the mixture reached about 60° C., 30 g of soy wax was added to the mixture and agitated to be completely mixed with the mixture.

Figure 2:
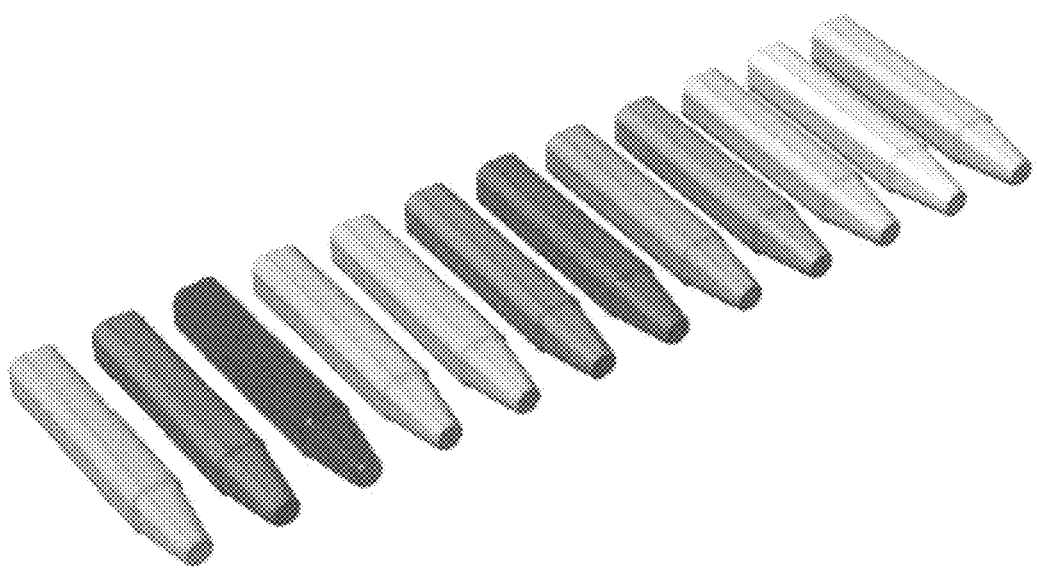
FIG. 2 is an eco-friendly crayon according to one embodiment of the present invention.

Finally, the mixture was cooled in a mold at −15° C. condition to prepare crayons (see FIG. 2).

Comparative Example 1

A Comparative Example 1 was carried out in the same manner as the Example 1 except that 20 g of carnauba wax was used.

Comparative Example 2

A Comparative Example 2 was carried out in the same manner as the Example 1 except that 20 g of the pigment was used.

Comparative Example 3

A Comparative Example 3 was carried out in the same manner as the Example 1 except that 300 g of carnauba wax was used.

Comparative Example 4

A Comparative Example 4 was carried out in the same manner as the Example 1 except that 50 g of soy wax, which is vegetable wax, was used.

Comparative Example 5

A Comparative Example 5 was carried out in the same manner as the Example 1 except that 10 g of the food coloring agent was used.

Comparative Example 6

A Comparative Example 6 was carried out in the same manner as the Example 1 except that no food coloring agent was added.

Comparative Example 7

A Comparative Example 7 was carried out in the same manner as the Example 1 except that no soy wax, which is vegetable wax, was added.

Experiment 1

The crayons prepared according to the Examples and the Comparative Examples of the present invention were used for 50 randomly selected teens and twenties males and females. After that, they were given seven items to give a detailed assessment of their experience. The results are averaged out below.

TABLE 1

|  | Color Formation | Applying Ability | Pigmentation (Hiding Power) | Hardness | Contamination and Fragrance | Preference | Stickiness | Total Score |
|---|---|---|---|---|---|---|---|---|
| EXAMPLE 1 | 4.7 | 4.5 | 4.9 | 4.6 | 4.1 | 4.9 | 4.5 | 32.2 |
| COMPARATIVE EXAMPLE 1 | 4.5 | 3 | 3 | 4 | 3 | 2 | 4.3 | 23.8 |
| COMPARATIVE EXAMPLE 2 | 4.8 | 4.2 | 2.8 | 4.1 | 3.8 | 2.1 | 4.8 | 26.6 |
| COMPARATIVE EXAMPLE 3 | 4.5 | 4.0 | 2.5 | 2 | 4.2 | 3 | 5 | 25.2 |
| COMPARATIVE EXAMPLE 4 | 4.6 | 2.4 | 2.6 | 4 | 4.5 | 3.1 | 4.9 | 26.1 |
| COMPARATIVE EXAMPLE 5 | 2.6 | 3.9 | 4.9 | 4.5 | 4.1 | 4.5 | 4.4 | 28.9 |
| COMPARATIVE EXAMPLE 6 | 2 | 3.1 | 3.1 | 4.3 | 2.9 | 3 | 4.4 | 22.8 |
| COMPARATIVE EXAMPLE 7 | 4.7 | 2 | 2 | 4.2 | 3 | 2.1 | 4.5 | 22.5 |

(Very good: 5 points, good: 4 points, average: 3 points, bad: 2 points, very bad: 1 point)

As shown in Table 1, according to the result of the actual user experiences, upon comparison to crayons according to the Comparative Examples, it is found that the eco-friendly crayons according to the present invention are less likely to leave colors or crayons on the user's hand, greatly slip and color on paper, and obtain a clear color when using the crayons. Moreover, since the crayons according to the present invention are prepared using only eco-friendly materials, it is obvious that it is harmless to the human body because there is no harmful component.

What is claimed is:

1. An eco-friendly crayon including
beeswax,
a pigment in an amount of 2 to 8 parts by weight based on 100 parts by weight of the beeswax,
a food coloring agent in an amount of 1 to 2 parts by weight based on 100 parts by weight of the beeswax, and
carnauba wax in an amount of 3 to 15 parts by weight based on 100 parts by weight of the beeswax.

2. The eco-friendly crayon of claim 1, wherein the eco-friendly crayon further includes one or more vegetable components selected from a group consisting of vegetable fat and vegetable wax.

3. The eco-friendly crayon of claim 2, wherein the one or more vegetable components selected from the group consisting of the vegetable fat and the vegetable wax are contained in an amount of 2 to 3 parts by weight based on 100 parts by weight of the beeswax.

4. A method for preparing an eco-friendly crayon of claim 1 comprising:
a) adding a pigment and food coloring agent while melting beeswax by heating;
b) cooling the beeswax to block and then pulverizing the blocked beeswax;
c) melting carnauba wax by heating;
d) mixing the pulverized beeswax obtained in the step b with the carnauba wax obtained step c to prepare a mixture; and
e) placing the mixture into a mold and cooling the mixture to prepare crayons.

5. The method of claim 4, wherein, after the step d and before the step e, the method further comprises cooling the mixture to a temperature range of 50 to 60° C. and adding one or more vegetable components selected from a group consisting of vegetable fat and vegetable wax.

6. The method of claim 4, wherein the heating in the step a is carried out within a temperature range of 60 to 90° C.

7. The method of claim 4, wherein the cooling in is carried out within a temperature range of −10 to −20° C.

8. The method of claim 4, wherein the heating in the step c is carried out within a temperature range of 70 to 95° C.

9. The method of claim 4, wherein the mixing in the step d is carried out within a temperature range of 75 to 85° C.

* * * * *